(12) United States Patent
Lee et al.

(10) Patent No.: US 7,333,534 B2
(45) Date of Patent: Feb. 19, 2008

(54) APPARATUS AND METHOD FOR PERFORMING FAST ACQUISITION OF PN SEQUENCES BY TRANSFERRING DISTRIBUTED SAMPLES

(75) Inventors: Byoung-Gi Lee, Seoul (KR); Byoung-Hoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 840 days.

(21) Appl. No.: 10/675,986

(22) Filed: Oct. 2, 2003

(65) Prior Publication Data

US 2004/0081228 A1    Apr. 29, 2004

Related U.S. Application Data

(60) Continuation of application No. 10/112,935, filed on Apr. 2, 2002, now Pat. No. 6,668,009, which is a division of application No. 09/045,943, filed on Mar. 23, 1998, now Pat. No. 6,389,058.

(51) Int. Cl.
   *H04B 1/707*    (2006.01)
(52) U.S. Cl. ............ 375/150; 375/142; 375/146
(58) Field of Classification Search ........ 375/134–137, 375/145–147, 149–150, 260, 142; 370/209, 370/335, 342
   See application file for complete search history.

(56) References Cited

U.S. PATENT DOCUMENTS

| | | | |
|---|---|---|---|
| 3,916,313 A | 10/1975 | Lowry | 375/260 |
| 5,216,693 A * | 6/1993 | Nakamura | 375/142 |
| 5,253,268 A * | 10/1993 | Omura et al. | 375/150 |
| 5,490,174 A | 2/1996 | Shin et al. | 375/316 |
| 5,644,591 A | 7/1997 | Sutton | 375/206 |
| 5,974,038 A | 10/1999 | Shou et al. | 370/335 |
| 6,314,129 B1 | 11/2001 | Sunwoo et al. | 375/149 |
| 2001/0004377 A1 | 6/2001 | Lee et al. | |

OTHER PUBLICATIONS

Polydoros et al., "A Unified Approach to Serial Search Spread-Spectrum Code Acquisition—Part I: General Theory," IEEE Transactions on Communications, vol. Comp32, No. 5, May 1984.

* cited by examiner

*Primary Examiner*—Young T. Tse
(74) *Attorney, Agent, or Firm*—Ked & Associates, LLP

(57) ABSTRACT

Disclosed is a method for performing fast distributed sample acquisition (DSA). A spreader generates a data signal by spreading an incoming data stream over a range of spectrum according to a locally generated first main sequence, and samples the state sample of the main sequence. A sample spreader outputs a first state signal by spreading a symbol according to a locally generated first subsequence. A sample despreader reconstructs the transmitted binary orthogonal symbols by despreading the first state signal obtained from the sample spreader according to a locally generated second subsequence to detect the first main sequence state sample. A despreader compares the state sample obtained from the sample despreader with a locally generated state sample and makes correction on a local SRG to generate a second main sequence having new state. An incoming data stream is reconstructed by despreading the data signal obtained from the spreader according to the second main sequence.

8 Claims, 10 Drawing Sheets

APPARATUS AND METHOD FOR PERFORMING FAST ACQUISITION OF PN SEQUENCES BY TRANSFERRING DISTRIBUTED SAMPLES

This is Continuation of application Ser. No. 10/112,935 filed Apr. 2, 2002, now U.S. Pat. No. 6,668,009, which is a Divisional of application Ser. No. 09/045,943 filed Mar. 23, 1998, now U.S. Pat. No. 6,389,058, the entire disclosures of which are hereby incorporated by reference.

BACKGROUND OF THE INVENTION

1. Field of the Invention

The present invention relates to an apparatus and method for performing fast acquisition of PN sequences by transferring distributed samples, more particularly, to the apparatus and method for the fast acquisition of PN sequence employing a distributed sample transmission in a CDMA mobile communication system of code division multiple access techniques.

2. Background of the Related Art

In a CDMA mobile system, to provide a good quality of data communication between mobile stations, the receiver must be able to be quickly and accurately synchronize with the PN sequences transmitted from a transmitter. In the case of a cellar system, the receiver has to be synchronized to the pilot signal transmitted from the base station. More specifically, the next generation mobile communication systems should have functions providing new services, such as wireless multimedia communication for transmitting and receiving data in a group in a given frequency band by connecting between personal data terminals and mobile units, to the multiple mobile unit users. Under this communication environment, the system has to be able to effectively process a large quantity of information being simultaneously communicated between multiple users. Therefore, the spreading of data must inevitably employ a PN sequence of long period.

For example, in the CDMA mobile communication system, the transmitter unit first spreads a data stream to be transmitted over a prescribed spectrum by using a PN sequence locally generated from a shift register generator (SRG) of the unit, and then transmit the spread spectrum of data. The receiver unit receives the transmitted spread spectrum, despreads the received spread spectrum by using a PN sequence generated from the SRG of the receiver unit and then recovers the data stream. To execute this process, it is necessary for the SRG of the receiver unit to be synchronized to the SRG of the transmitter unit. The synchronization process includes two steps of which one is PN sequence acquisition (code acquisition) and the other is PN sequence tracking (code tracking). The two steps are sequentially executed.

In order to provide a fast and reliable service in the multimedia communication environment, a considerable amount of research on the fast code acquisition techniques has been exerted during the past decades.

One technique among the conventional techniques is a serial search acquisition method. The serial search acquisition method has the advantage of simple hardware, but the acquisition time is very long for a long-period PN sequence, because the acquisition time is directly proportional to the period of PN sequence. Therefore, several fast acquisition schemes have been developed at the cost of increased hardware complexity.

To improve the acquisition speed, a method keeping the basic structure of serial search system is provided, to which is added a two-step acquisition process, of which one step employs a passive matched filter to determine a temporary acquisition point and the other step employs an active correlator to verify the effectiveness of the temporary acquisition. Another method to improve the acquisition speed is a sequential test method using two threshold compare circuits in addition to the existing serial search scheme.

However, those methods based on the serial search do not have satisfactory acquisition speed since its absolute acquisition time is long when the sequence is long.

A recently developed technique based on the serial search method is disclosed in U.S. Pat. No. 5,644,591. In this technique, a large search window is offered in a first search step for a fast acquisition and a maximum value of correlation of each window is compared with a threshold value. When the maximum correlation is not larger than the threshold, the comparing process for the next window sequentially continues. When the maximum correlation of a window is larger than the threshold, that point is selected as a central point for a choice of a smaller search window and it is determined if the acquisition is true. Thus, by two windows having different size to each other, a candidate for the acquisition is first selected and then a confirmation of the acquisition is made. Therefore, a short acquisition time is expected. In spite of the short acquisition time, however, this method has a limitation in reducing the acquisition time when the period of the PN sequence is long since a serial search technique based on the correlation comparison is employed.

For a long sequence case, however, the parallel acquisition scheme may render a solution but the hardware complexity, that is, the number of active correlators or matched filters, increases to the order of code period.

To get around this problem, serial-parallel hybrid schemes have been proposed for practical use, in which a long code sequence of period N is divided into M subsequences, each of which having length N/M, and the acquisition circuit is thus composed of M parallel matched filters. The acquisition time of this hybrid scheme, however, is not improved as much as expected at the cost of increased hardware complexity.

Another method to improve the acquisition time uses a state estimation of the shift register generator. Theoretically, this method does not increase the complexity of hardware, compared with the serial search scheme, but it has a comparatively good acquisition time.

The acquisition method based on state estimation is a kind of rapid acquisition by sequential estimation that makes L consecutive hard decisions on the incoming code chips and loads them to the receiver SRG as the current SRG states. Therefore, this technique is successful in speeding up the acquisition process. On the other hand, in fact, it is not suitable for practical use because its performance rapidly deteriorates in a low SNR environment.

Furthermore, because of the unrealizable fact that a carrier phase must be obtained before the acquisition completion of PN sequence since coherent demodulation is used to determine whether the value of each sequence chip is positive or negative, the state estimation technique is not suitable for practical use.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide apparatus and methods for performing a fast acquisition of PN sequence through a distributed sample acquisition in spread spectrum communication system which rapidly acquires the PN sequence of long period generated in a multimedia communication environment by using a distributed sample acquisition (DSA) having an acquisition method of PN sequence based on new state estimation and reduces the total synchronization time between the transmitter and the receiver.

Another objective of the present invention is to provide the apparatus and the method, when the distributed sample is transmitted from a transmitter to a receiver, having a fast synchronization between the transmitter SRG and the receiver SRG and a reliable transmission under CDMA environment where the average chip-SNR is very low.

Another objective of the present invention is to provide the apparatus and the methods having much more improved acquisition speed but less complex hardware, compared with a conventional technique.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the apparatus and the method according to the present invention include a spreader which generates a data signal by spreading an incoming data stream over a predetermined range of spectrum according to a locally generated first main sequence and samples the state sample of said main sequence, a sample spreader which makes the state sample output from said spreader corresponding to one of binary orthogonal symbols having a predetermined length and then outputs a first state signal by spreading said symbol according to a locally generated first igniter sequence (first subsequence), a sample despreader which reconstructs the transmitted binary orthogonal symbols by despreading said first state signal obtained from said sample spreader according to a locally generated second igniter sequence (subsequence) and therefrom detects the state sample of said first main sequence, and a despreader which compares the state sample obtained from said sample despreader with a locally generated state sample and makes correction on the despreader SRG states using them as many as predetermined times, generates a second main sequence having new states, and reconstructs said incoming data stream by despreading the data signal obtained from said spreader according to said second main sequence.

Another objective is achieved by including a sample despreader to detect the state signal of sequence provided from an external system according to a locally generated igniter sequence, and a despreader to generate a new state signal by comparing the state samples obtained from said sample despreader with locally generated state samples and by correcting the SRG provided within itself a predetermined number of times and to reconstruct the original data stream by despreading the received data signal according to said second main sequence.

Another objective is achieved by including the steps for acquiring the igniter sequence, for detecting the state sample value of sequence of a predetermined period from the igniter sequence, and for acquiring said sequence by using said state sample value.

It is to be understood that both the foregoing general description and the following detailed description are exemplary and explanatory and are intended to provide further explanation of the invention as claimed.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made in detail to the preferred embodiments of the present invention, examples of which are illustrated in the accompanying drawings.

Figure 1A:
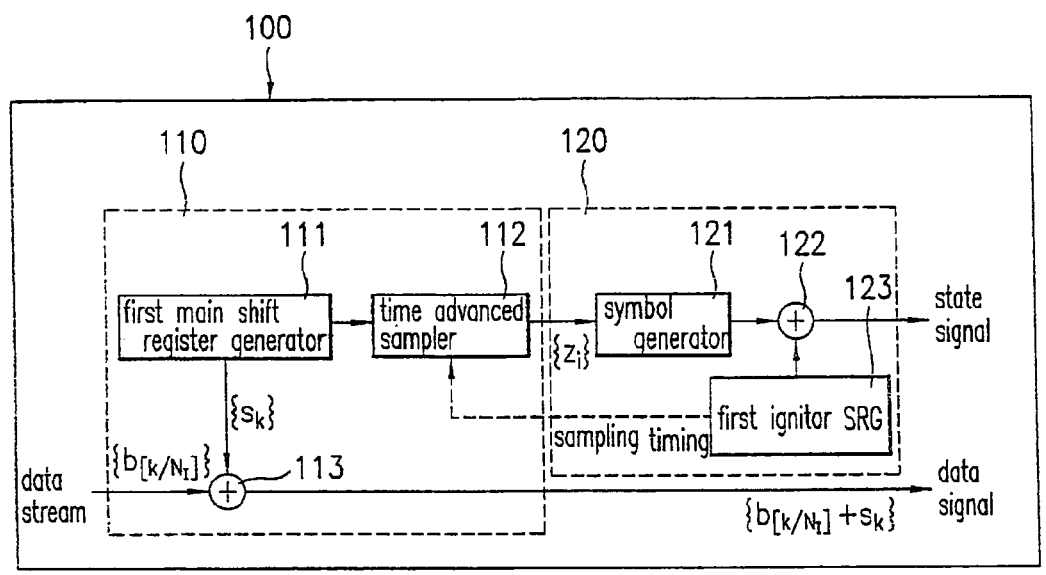
FIG. 1A is a block diagram showing the transmitter transmitting PN sequences in a distributed sample acquisition (DSA) apparatus according to the present invention.
Figure 1B:
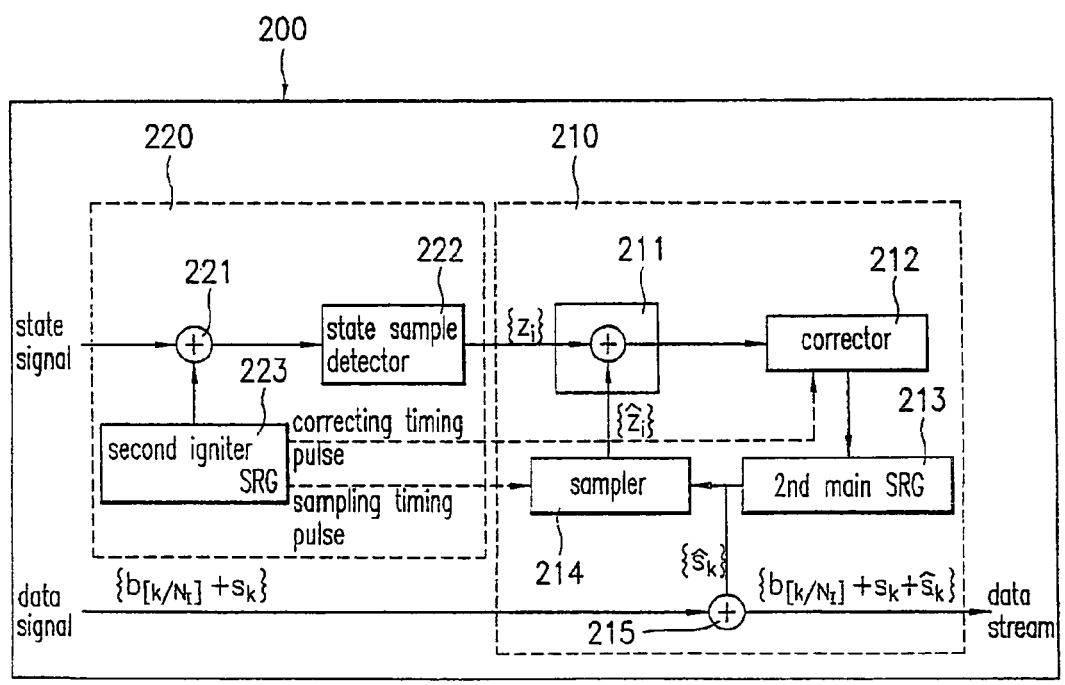
FIG. 1B is a block diagram showing the receiver acquiring the PN sequence in a distributed sample acquisition (DSA) apparatus according to a preferred embodiment of the present invention.

FIGS. 1A and 1B are functional block diagrams of the apparatus according to the present invention.

Referring to FIGS. 1A and 1B, the distributed s-ample acquisition (DSA) apparatus of the present invention includes a transmitter block 100 and a receiver block 200. The transmitter block 100 includes a distributed sample acquisition (DSA) spreader 110 and a sample spreader 120 and the receiver block includes their despreading counterparts, that is, DSA despreader 210 and sample despreader 220, respectively. The transmitter 100 has a function for transmitting PN sequences and the receiver 200 has a function for acquiring the PN sequences in a distributed sample acquisition (DSA).

This distributed sample acquisition (DSA) apparatus of the preferred embodiment of the present invention for transmitting and acquiring PN sequences may be used for a mobile station and/or a base station.

Referring to FIG. 1A, the transmitter 100 preferably includes a distributed sample acquisition (DSA) spreader 110 which generates data signals by spreading an incoming data stream over a predetermined spectrum according to a locally generated main sequence. It further includes samples a state sample of the main sequence and a sample spreader 120 which makes the state sample obtained from said DSA spreader 110 corresponding to one of binary orthogonal symbols having a predetermined length and outputs a state signal by spreading said symbol according to a locally generated igniter sequence (an auxiliary sequence or a subsequence).

Referring to FIG. 1B, the receiver 200 preferably includes a sample despreader 220 which reconstructs the transmitted binary orthogonal symbols by despreading said state signal obtained from said sample spreader 120 according to a locally generated igniter sequence an therefrom detects the state sample of said main sequence. It further includes a despreader 210 which compares the state sample obtained from said sample despreader 220 with a locally generated state sample and makes corrections on the despreader SRG states using them as many as a predetermined number of times, generates a main sequence having new states, and reconstructs the incoming data stream by despreading the data signal obtained from said DSA spreader 110 according to the second main sequence.

DSA spreader 110 of the transmitter 100 preferably includes a first main shift register generator (SRG) 111 to locally generate a PN sequence, a spreader 113 to spread an incoming data stream over a predetermined spectrum according to the PN sequence of the first main SRG 111, and a time-advanced sampler 112 which time-advanced samples the state sample of the PN sequence obtained from the first main SRG 111.

The sample spreader 120 preferably includes a symbol generator 121 which makes the state sample value obtained from said time-advanced sampler 112 of the DSA spreader 110 corresponding to one of binary orthogonal symbols having a predetermined length, an igniter shift register generator (SRG) 123 which locally generates an igniter sequence (a subsequence), and a spreader 122 which spreads the symbol obtained from the symbol generator 121 by using the igniter sequence.

The sample despreader 220 of the receiver 200 preferably includes an igniter SRG 223 which locally generates an igniter sequence, a despreader 221 which despreads the state signal obtained from the spreader 122 of the sample spreader 120 by using an igniter sequence obtained from the igniter SRG 223, and a state sample detector 222 which detects a state sample from an output signal of the despreader 221.

DSA despreader 210 preferably includes a sampler 214 to sample a state sample according to a sampling timing pulse provided from the igniter SRG 223, and a comparator 211 to compare a state sample obtained from the state sample detector 222 of the sample despreader 220 with a state sample locally generated from the sampler 214. It further includes a second main shift register generator (SRG) 213 to generate a main sequence corrected by the operation of the corrector 212, and a corrector 212 to correct the state of the second main SRG 213 by the output signal of the comparator 211 according to a correction timing pulse obtained from the second igniter 223 of the sample despreader 220. The DSA despreader 210 finally preferably includes despreader 215 to despread the data signal obtained from the spreader 113 according to the new main sequence obtained from the second main SRG 213.

The distributed sample acquisition apparatus according to the preferred embodiment of the present invention including the transmitter 100 and the receiver 200 may be used in a mobile station and the receiver 200 may be used in a mobile station which only receives a signal transmitted from a base station. In this case, the transmitter 100 is used in the base station.

A synchronization function between the DSA spreader and despreader 110 and 210 and a sample transmission function between the sample spreader and despreader 120 and 220 are supported by the main SRGs 111 and 213 in the DSA spreader and despreader 110 and 210 and the igniter SRGs 123 and 223 in the sample spreader and despreader 120 and 220, respectively.

The main SRGs 111 and 213 generate main sequences which are PN sequences for despreading a data stream (signal) and object sequences for synchronization. The igniter SRGs 123 and 223 generate igniter sequences conveying and receiving the sample of the main SRG 111 for the acquisition of the main sequence. The igniter sequence is also called an auxiliary sequence introduced for a synchronization of the main sequence which is an object sequence of the synchronization and its function is to reliably transmit the state values of the main SRG to the receiver and to provide a reference point of timing for sampling and correcting the state of the SRG of the receiver.

Referring to FIGS. 1A and 1B, the period $N_I$ of the igniter sequence is selected much shorter than the period $N_M(=2^L-1)$ of the main sequence. The time-advanced sampling block 112 samples the state sample $z_1$ of the main SRG 111 in advance. In other words, the time-advanced sampling block 112 of the transmitter block 100, at time $(r+i-1)N_I$, samples the sequence value (the state sample) which will be generated from the main SRG 111 at time $(r+i)N_I$. The symbol generator 121 makes the output of the DSA spreader block corresponding to one of binary orthogonal symbols having a length $N_I$, spreads the symbol as an igniter sequence of one period, and thereafter transmits the result. Then, the sample despreader block of the receiver block 200 despreads the received state signal and regenerates the transmitted sample $z_1$ by comparing the result with each binary orthogonal symbol.

The DSA despreader block 210 generates the state sample $\hat{z}_i$ of the SRG 213 in the receiver block 200, compares the sample with the transmitted sample $z_i$ and begins its correcting operation. The state sampling operation and the correcting operation get started by the sampling and correcting pulse provided from the igniter SRG 223 of the sample despreader block 220.

Figure 3A:
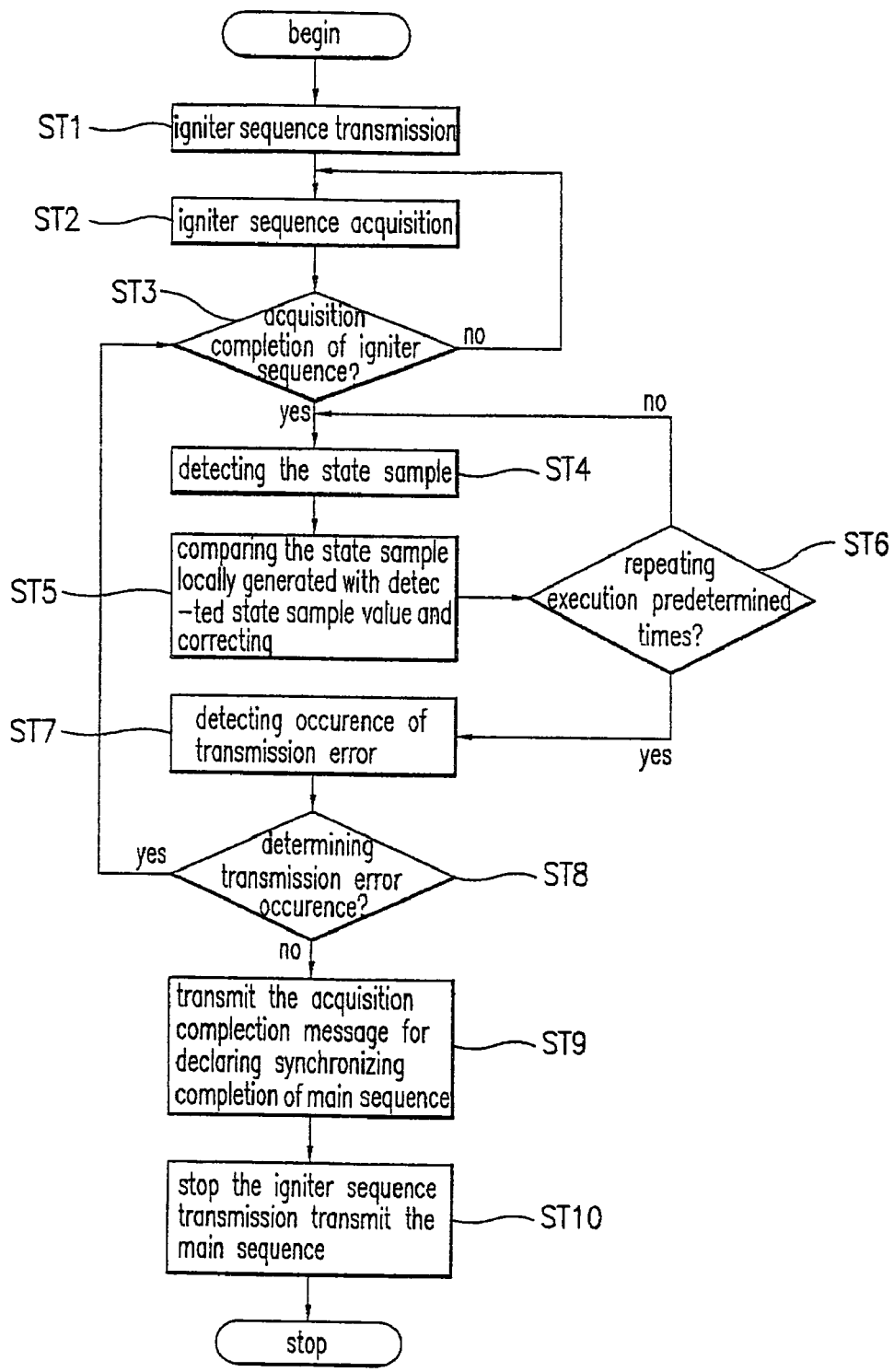
FIGS. 3A and 3B are control flow diagram to explain the operation of capturing the PN sequences in the DSA apparatus according to the present invention.

Referring to FIG. 3A, an operation of the fast acquisition of PN sequences in the distributed sample acquisition apparatus according to the present invention is described when a point-to-point communication is a wireless communication system.

The principle of the apparatus according to the preferred embodiment is based on the fact that, if a pair of shift register generators (SRG) in the transmitter and the receiver of the distributed sample acquisition apparatus according to the preferred embodiment of the present invention which is installed at each mobile station of CDMA communication system have the same structure, the two sequences are synchronized by carrying the identical state values (L values stored in the SRG having a length L) at the same time. Therefore, if there is a transmission route between one pair of SRGs, the state samples of the SRG of the transmitter block is transmitted to the receiver block and the acquisition of PN sequences is accomplished much faster than the case of conventional method in which the synchronization is done by evaluating the maximum value of correlation of the sequence. However, to accomplish the acquisition of sequences based on the state sample transmission, the problems of how to reliably transmit the state sample in the CDMA channel having a very low chip-SNR and of how to accomplish the synchronization of the sequences by using the transmitted state sample have to be solved.

The transmitter block 100 shown in FIG. 1A transmits only a modulated igniter sequence to the receiver block 200 (ST1). The main SRG 111 in the transmitter block 100 is preferably locally in operation.

The receiver block 200 captures the igniter sequence by a conventional serial search method or parallel search method (ST2). In this block ST2, the period of the igniter sequence is very short as compared with the main sequence and therefore the acquisition time is also very short. Then, the receiver block 200 determines whether the acquisition of the igniter sequence has been accomplished (ST3). If the accomplishment of the acquisition is determined, the sample despreader block 220 of the receiver block 200 despreads the state signal every period $N_I$ of the igniter sequence and detects the transmitted state sample $z_i$ by a conventional noncoherent detection method using an orthogonal symbol or a difference code (ST4).

The DSA despreader block 210 compares the state sample $z_i$ determined at every igniter sequence period with the state sample $\hat{z}_i$ locally generated from the main SRG 213 of the receiver block 200 at the beginning of the next igniter sequence period and, according to the result, maintains the state of the main SRG 213 itself or makes correction (ST5).

The DSA spreader block 110 takes the sample generated from the main SRG 111 of the transmitter block 100 in advance by $N_I$, while it takes $N_I$ to detect the transmitted sample. Therefore, the sampling time for $z_i$ and the sampling time for $\hat{z}_i$ coincide with each other.

When and how to correct the main SRG 213 of the receiver block 200 will be described next.

Figure 2:
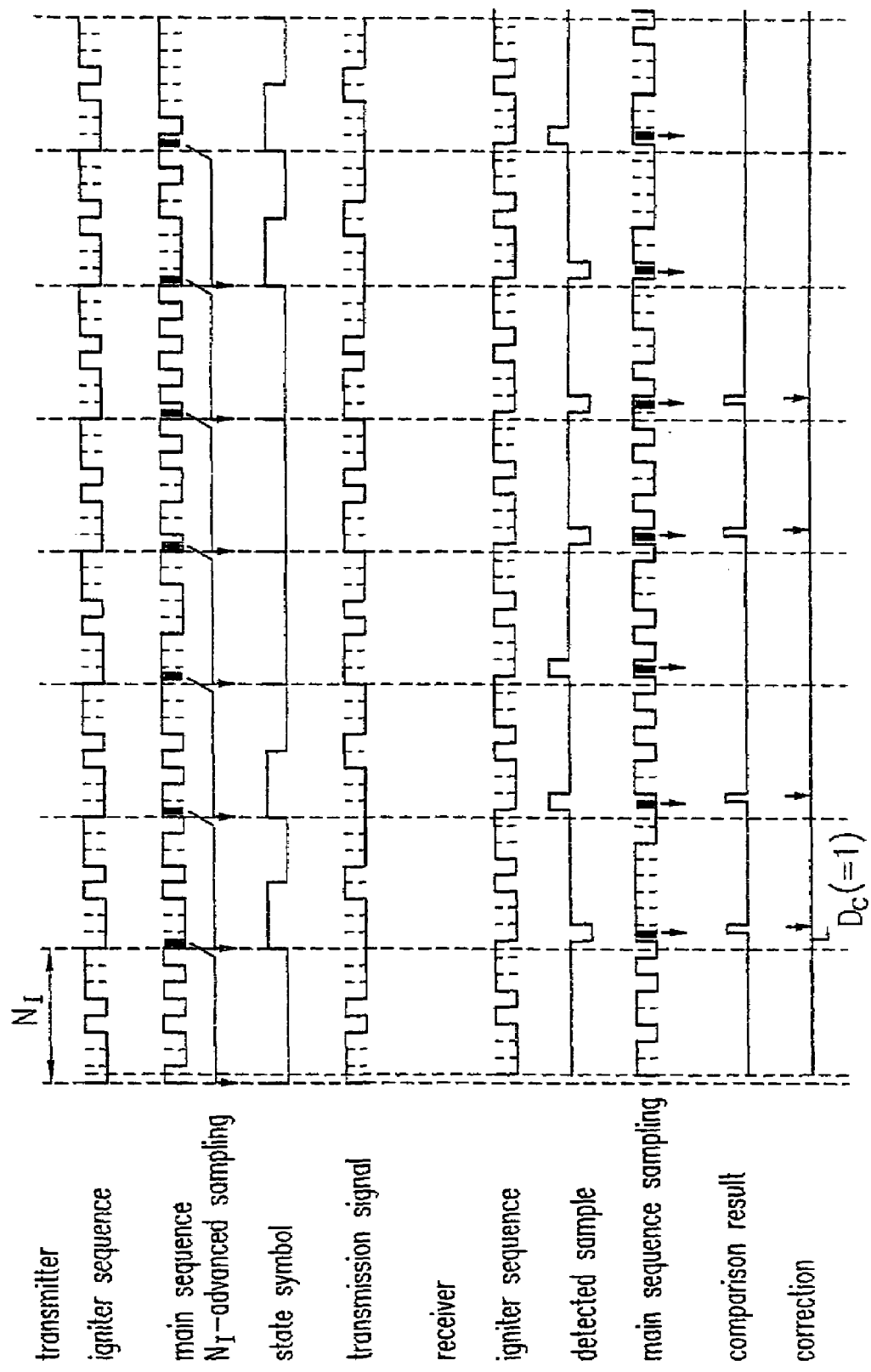
FIG. 2 is a timing diagram for sampling pulses and correction pulses provided from an igniter sequence (a subsequence) generator of FIG. 1.

The sampling timing pulse and the correcting timing pulse provided from the igniter SRG 223 are shown in FIG. 2. The state of the main SRG 213 has to be synchronized with the state value of the main SRG 111 of the transmitter block 100 which is delayed as much as the transmission delay time between the transmitter and the receiver. However, the main SRG 213 of the receiver block 200 accomplishes its synchronization based on the signal received at the receiver and therefore the transmission delay does not affect on the synchronization process. Therefore, the transmission delay time is not shown in FIG. 2.

The receiver block 200 determines if the comparison-correction operation is executed a prescribed number L of times (ST6). If it is not executed the prescribed number of times, the execution of step ST4 is repeated. On the contrary, if the operation is done as many as a predetermined number L of times, then the main SRG 213 of the receiver block 200 having a length L is held to be in its synchronization and it is detected whether a transmission error has occurred (ST7).

If there is no transmission error in any one sample among the transmitted L samples in step ST8, a completion of synchronization of the main sequence is declared in step ST9 and the completion message of the acquisition is transmitted to the other side.

If, however, it is determined in step ST8 that a transmission error has occurred, the igniter sequence acquisition step S73 is re-executed.

Since the occurrence of the transmission error leads to a false synchronization state, a verification process for verifying the true synchronization is preferably included in step ST8. There are many complex techniques for verifying the true synchronization, but in the apparatus according to the preferred embodiment of the present invention, a comparatively simple verification process executing additional v times comparison after the comparison-correction processes is done. This process (ST8) can be also executed by using the conventional correlation value and threshold based method.

If v pairs of samples coincide with each other, the receiver block 200 declares the synchronization completion of the main sequence and transmits the acquisition completion message to the other side (ST9). There are many techniques to transmit the acquisition completion message to the other side. The most effective method among them is what the synchronized main sequence (or a sequence derived from it) is transmitted. Using this sequence, the main SRG 213 of the other side is able to immediately verify the synchronization. In this case, the time for the acquisition of the transmitted sequence is very short.

This short time is the result of the pair of main SRGs 111 and 213 provided in the transmitter block 100 and the receiver block 200, respectively, having been already synchronized with each other. Of course, there exists an uncertain period because of the transmission delay owing to a geographical distance between the two blocks, but the distance is generally short. If any pair of samples do not coincide with each other, the receiver block 200 preferably returns to the igniter sequence search state and executes its beginning of the acquisition process.

As soon as the acquisition completion message has been received, the transmitter block 100 preferably stops transmitting the modulated igniter sequence and begins to transmit a main sequence modulated with data (ST10). The receiver block 200 stops the igniter SRG 223 and then detects the transmitted data through the main sequence tracking process.

In spite of its verification process, there may exist a false synchronization (a false signal). The possibility is low, but the v pairs of samples may coincide with each other without the synchronization. Therefore, during executing the detection for the main data signal, a confirmation for the true/false of the resulted synchronization may be necessary. Based on the fact that a data detection performance like the bit error probability decreases below the target value under the false synchronization, the detection performance of the receiver block has to be observed for a certain period. When the acquisition turns out true, the data detection is executed without interruption. When the acquisition turns out false, the declaration for the acquisition completion is retracted and the igniter sequence search step of the beginning is immediately executed.

Figure 3B:
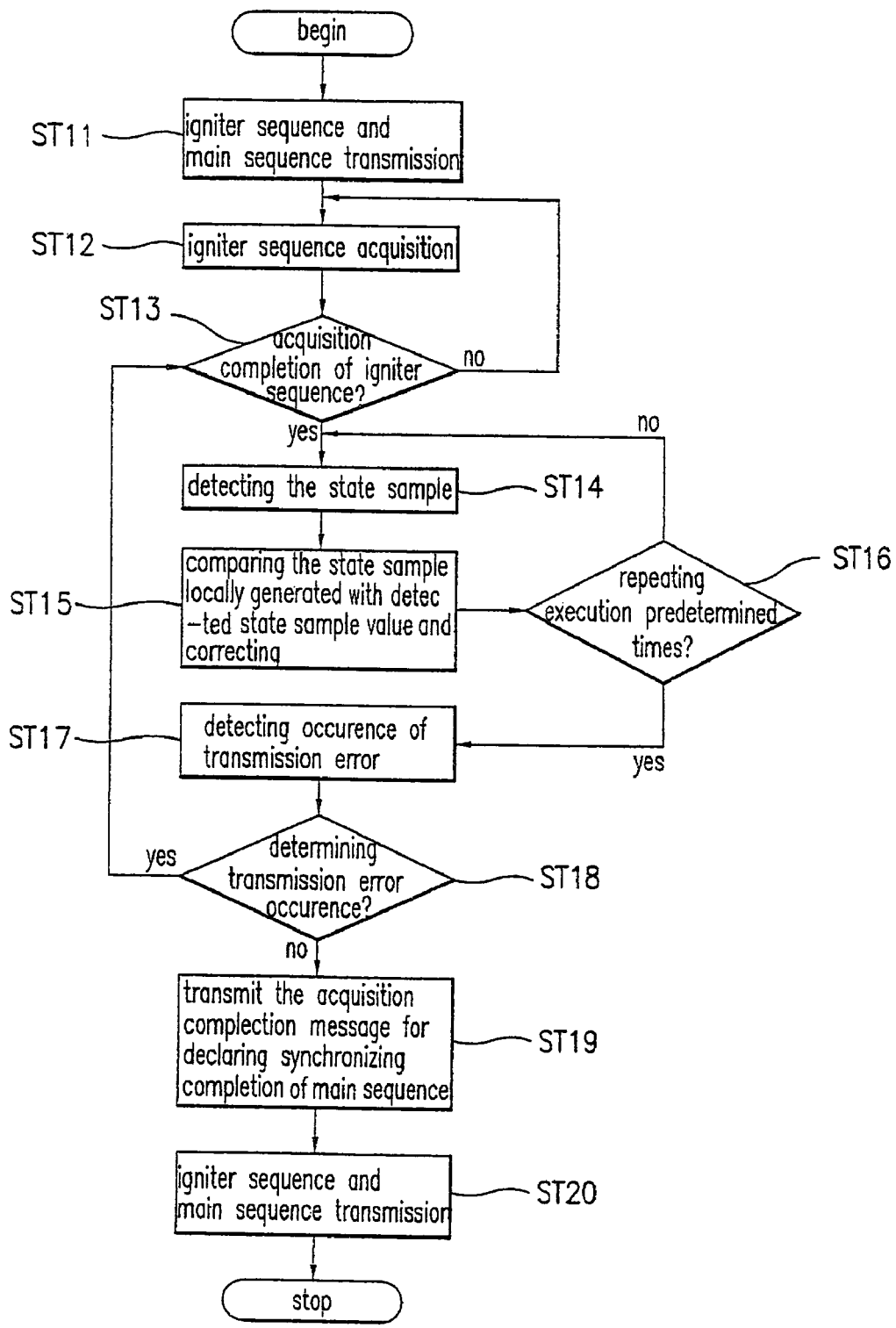

On the contrary, in the case of a wireless communication system based on the broadcasting system such as cellular base station, the transmitter block of the mobile device is generally the same as the conventional CDMA transmitter block and the receiver block of the mobile device includes the receiver structure 200 shown in FIG. 1B. In this case, the transmitter block 100 shown in FIG. 1A is installed at each base station and may include an igniter SRG having structure different from each other. The fast acquisition process, as shown in FIG. 3B, is very similar to that of FIG. 3A, but the operation of steps ST11 and ST20 are different from each other. In other words, the igniter sequence is continuously transmitted together with the main sequence to be used as a pilot sequence and that assists the receiving mobile station in accomplishing the fast synchronization with the pilot sequence of the base station (ST1). In addition, an igniter sequence and a main sequence are continuously transmitted to the receiver block 200 after the acquisition completion message is received (ST20). Channel may be increased according to the additional igniter sequence transmission, but the increment of the interference signal caused in the main channel may be small in the case of a practical multiple connection channel having a low signal to noise ratio (SNR).

In the following, the main SRGs 111 and 213 of the DSA spreader and despreader 110 and 210, respectively, are described.

Figure 4A:
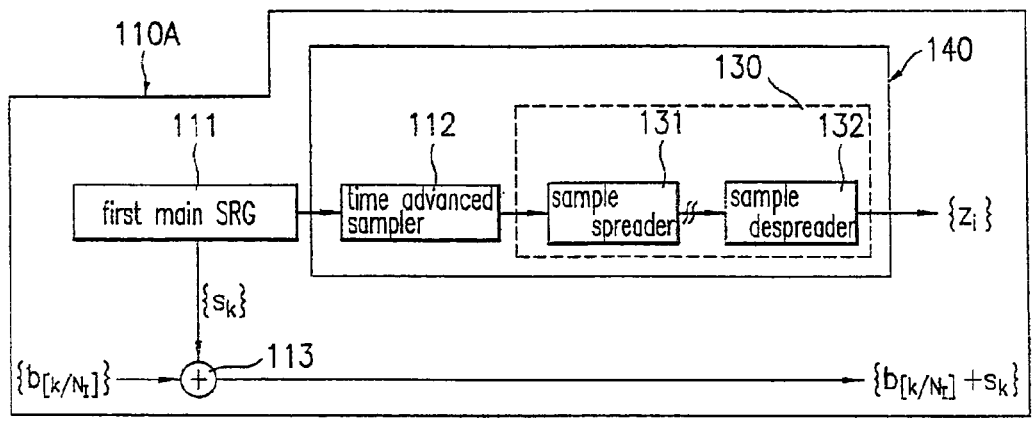
FIGS. 4A to 4C are the simplified block diagrams showing the transmitter and the receiver of FIG. 1.
Figure 4B:
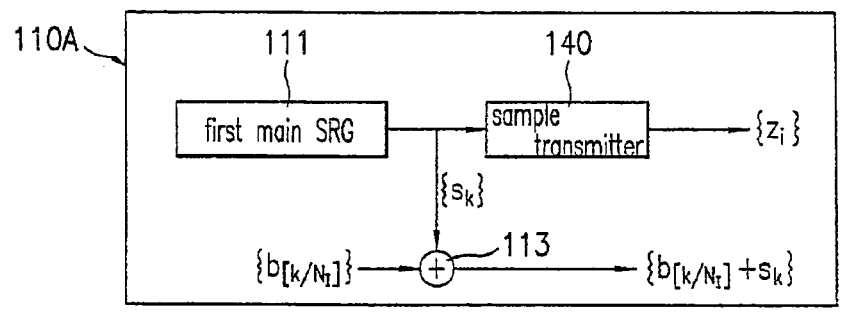
Figure 4C:
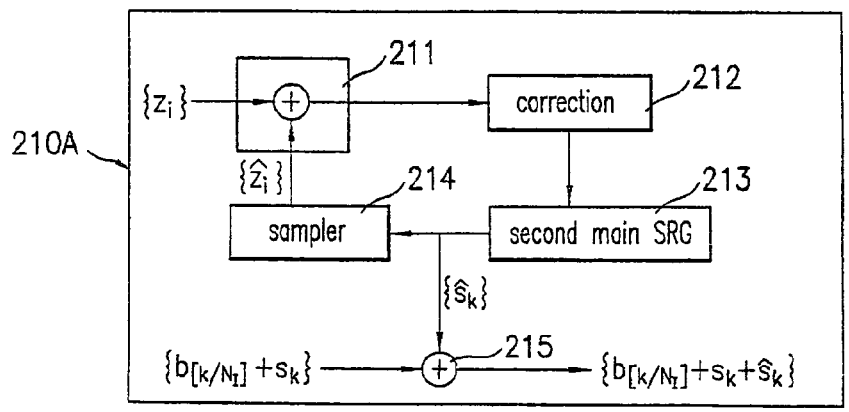

The transmitter block and the receiver block for transmitting or receiving a PN sequence are shown as a block diagram in FIGS. 4A to 4G. In FIGS. 4A and 4B, the sample spreader and despreader 120 and 220 shown in FIGS. 1A and 1B are combined into the sample transmitter 140. In FIG. 4A, the dotted section shows the total processing delay $N_I$, while the time advanced sampling block 112 in FIG. 1A has a delay of $-N_I$. Therefore, the ultimate operation being obtained by connecting these two sections is to sample the sample $z_i$ at the virtual sampling time $(r+I)N_I$.

FIG. 4B shows the equivalent block diagram 110A of the DSA spreader 110 shown in FIG. 1A. FIG. 4G shows the equivalent block diagram 210A of the DSA despreader 210 shown in FIG. 1B.

In order to make the bit stream $\{b_{[K/N_I]}+s_k+\hat{s}_k\}$ obtained from the DSA despreader 210 of FIG. 1B identical to the original bit stream $\{_{[K/N_I]}\}$, the main sequence $\{s_k\}$ of the despreader block 210A of FIG. 4G has to be identical to the main sequence $\{s_k\}$ of the spreader 110A at every time. This happens only when the SRG 213 of the despreader 210 of FIG. 1B is synchronized with the SRG 111 of the spreader 110. In order for this kind of synchronization, in the preferred embodiment of the present invention, the sample $z_i$ sampled from $\{s_k\}$ which is obtained at the virtual sampling time $(r+I)N_I$ is compared with the sample $\{\hat{z}_k\}$ sampled from the sample $\{\hat{s}_k\}$ at the same time and the difference between them is reflected on the state correction of the SRG 213 of the despreader 210. In this synchronization method, the comparison-correction has to be done L times in order to synchronize the SRG having a length L.

Through the close mathematical modeling for the DSA spreader and despreader 110A and 210A of FIG. 4, a sampling time, a prediction sampling method, and the correction process of SRG state are described.

A Mathematical Modeling for the DSA Spreader and Despreader Blocks

Let $d_k$ and $\hat{d}k$ denote the state vectors of SRG of scrambler and descrambler at time k, respectively, and T be the state transition matrix.

$$d_{k+1}=T \cdot d_k \quad \text{(Equation 1a)}$$

$$\hat{d}_{k+1}=T \cdot \hat{d}_k \quad \text{(Equation 1b)}$$

are established, where Equation (1b) is concerned to the SRG state vector of the despreader in which correction is not yet done. If correction is done, the Equation (1a) is changed into equation 5 which will be described later.

Let h denote the generating vector of the SGR generating the sequence $\{S_k\}$ (or $\{\hat{s}_k\}$).

$$s_k = h^t \cdot d_k \quad \text{(Equation 2a)}$$

and $$\hat{d}_{k+1}=T \cdot \hat{d}_k \quad \text{(Equation 2b)}$$

are established. If $c_0$ denotes a correction vector that corrects a previous state vector to a new state vector $\hat{d}_{new}$, s following Equation 3 is established.

$$\hat{d}_{new}=\hat{d}_{ol}+(z_i+\hat{z}_i)c_0 \quad \text{(Equation 3)}$$

Figure 5:
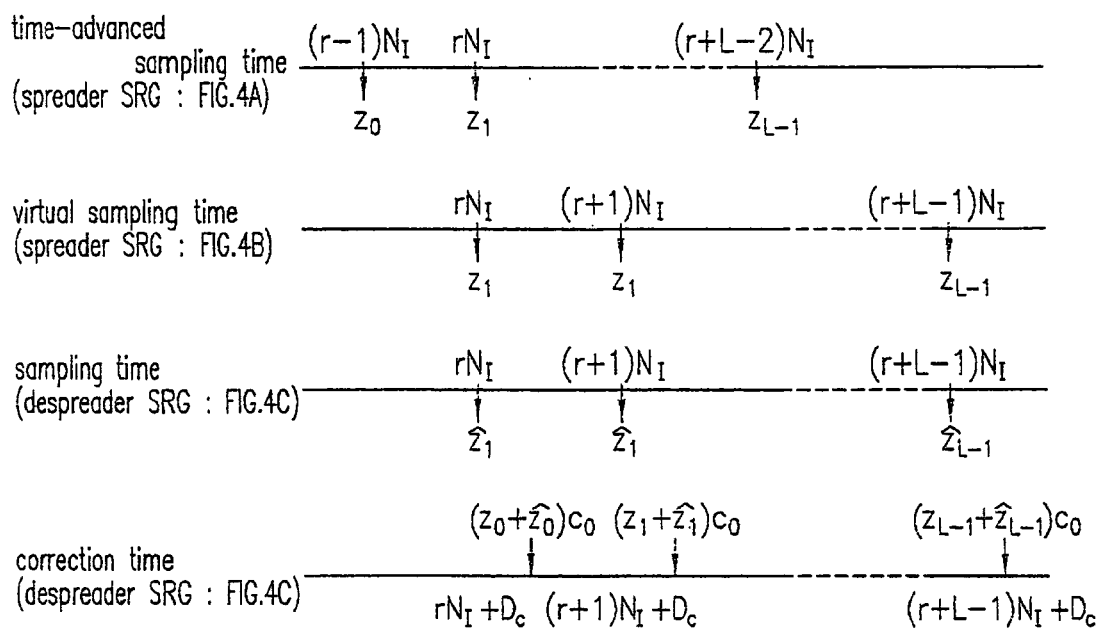
FIG. 5 is a timing diagram for sampling the state samples obtained from the spreader shift register generator (SRG) of FIG. 1 and for correcting the states of the despreader SRG (or the value of the states)

As explained beforehand, each of samples $z_i$ and $\hat{z}_i$, I=0, 1, 2, ... L−1 are both taken at the same sampling time $(r+I)N_I$, respectively from the (virtual) spreader 110A of FIG. 4B and the despreader 220A of FIG. 4G, and whenever the two samples are different from each other, the correction on the SRG 213 is done at time $(r+I)N_I+D_c$. The correction delay $D_c$ satisfies the condition of $0 \leq D_c \leq N_I$. FIG. 5 shows the timing chart concerning to this operation. The samples $z_i$ and $\hat{z}_i$ are represented by the state vectors as follows.

$$z_i=s_{(r+i)N_I}=h^t \cdot d_{(r+i)N_I} \quad \text{(Equation 4a)}$$

$$\hat{z}_i=\hat{s}_{(r+i)N_I}=h^t \cdot \hat{d}_{(r+i)N_I}, I=0, 1, \ldots L-1 \quad \text{(Equation 4b)}$$

The state vectors at the correction time are as follows.

$$d_{(r+i)N_I+D_c}=T \cdot d_{(r+i)N_I+D_c-1} \quad \text{(Equation 5a)}$$

$$\hat{d}_{(r+i)N_I+D_c}=T \hat{d}_{(r+i)N_I+D_c-1}+(z_i+\hat{z}_i)c_0 \quad \text{(Equation 5b)}$$

The synchronization between two SRGs 111 and 213 installed in spreader block 110 and despreader block respectively, is accomplished when the two state vectors $d_k$ and $\hat{d}_k$ are equal to each other. Therefore, let the state difference vector be defined as follows.

$$\delta_k=d_k+\hat{d}_k \quad \text{(Equation 6)}$$

Then, by combining Equations (1a), (1b), (4a), (4b), (5a), and (5b) and applying the result to Equation (6), Equation (7) is obtained.

$$\delta_{(r+i)N_I+D_c}=(T^{D_c}+c_0 h^t)\delta_{rN_I} i=0$$

$$\delta_{(r+i)N_I+D_c}=(T^{N_I}+c_0 h^t T^{N_I-D_c})\delta_{(r+i)N_I+D_c}, i=1, 2, \ldots L-1 \quad \text{(Equation 7)}$$

The relationship between the initial state difference vector $\delta_{rN_I}$ and the final state difference vector $\delta_{(r+L-1)N_I+D_c}$ obtained after L time corrections is as follow.

$$\delta_{(r+L-1)N_I+D_c}=\Lambda \delta_{rN_I} \quad \text{(Equation 8)}$$

In this equation, $\Lambda$ is a L×L correction matrix being defined as follows.

$$\Lambda=(T^{N_I}+c_0 h^t T^{N_I D_c})^{L-1}(T^{D_c}+c_0 h^t) \quad \text{(Equation 9)}$$

In order to accomplish the synchronization through L time correction, $\delta_{(r+L-1)N_I+D_c}$ has to be always a 0-vector without regard to $\delta_{rN}$ This is achieved by making $\Lambda$ a 0-matrix. Therefore, the synchronization problem of the DSA spreader and despreader whose SRGs are characterized by T and h comes to the design problem of $N_I$, $D_c$ and $C_0$ which make $\Lambda$ a 0-matrix. The structure of the SRGs is determined according to the state transition matrix T and the sampling structure of the SRG is determined according to the generation vector h. Therefore, because the overall structure is entirely determined by T and h, this structure is called "SRG characterized by T and h" in the preferred embodiment of the present invention.

Sampling and Correction Conditions for Synchronization

For the SRG of length L structured by the state transition matrix T and the generating vector h, the discrimination matrix, h is defined as follow.

$$\Delta_{T,h} \equiv \begin{Vmatrix} h^t \\ h^t \cdot T^{N_I} \\ h^t \cdot T^{2N_I} \\ \vdots \\ h^t \cdot T^{(L-1)N_I} \end{Vmatrix} \quad \text{(Equation 10)}$$

where $N_I$ denotes the sampling interval.

Then, a following theorem concerned with the interval $N_I$ for executing a sampling is established.

[Theorem 1] Sampling Time Condition

For the non-singular state transition matrix T, if the sampling interval $N_I$ is chosen such that the discrimination matrix $\Lambda_{T,h}$ of Equation 10 becomes a nonreciprocal matrix, in spite of any choice of correction delay time $D_c$ and correction vector $c_0$, the correction matrix $\Lambda$ of Equation 9 cannot become a 0-matrix.

Theorem 1 provides a necessary condition for selecting $N_I$ necessitated to make the despreader SRG synchronizable with the spreader SRG. According to this theorem, the period of the igniter sequence should be chosen such that the relevant discrimination matrix $\Lambda_{T,h}$ becomes reciprocal.

Once the sampling interval $N_I$ is selected so that $\Lambda_{T,h}$ is reciprocal, then a following theorem concerned with the choice of the correction delay time $D_c$ and the correction vector $c_0$ is established.

[Theorem 2] Correction Period Condition

For a reciprocal state transition matrix T, let the sampling interval $N_I$ be chosen such that the discrimination matrix $\Lambda_{T,h}$ is reciprocal. Then, the correction matrix $\Lambda$ of Equation 9 becomes a 0-matrix if the correction vector $c_0$ is evaluated, for an arbitrary correction delay time $D_c$ in $0\ D_c N_I$, by the following equation, $$c_0 = T^{(N-1)N_I + D_c} \cdot \Delta_{T,h}^{-1} \cdot e_{L-1} \quad \text{(Equation 11)}$$

where the L-vector $e_{i-1}$ denotes the I-th standard basis vector whose I-th element is 1 and the others are 0. In the preferred embodiment of the present invention, when denoting the element location in an L vector or an L×L matrix, a subscript variable n having a range of 1 and L×L instead of 0 and L×(L−1) is used.

The theorem for the correction period condition is proved as follows.

To begin with, by expanding an equation $\Delta_{T,h} \cdot \Delta_{T,h}^{-1} = I$ a following equation is obtained.

$$h^t \cdot T^{iN_I} \cdot \Delta_{T,h}^{-1} = e_i^t, \ i = 0, 1, \ldots, L-1 \quad \text{(Equation 12)}$$

Since T is reciprocal, Equation 9 can be written as $\Lambda = \Lambda^{*L} \cdot T^{D_c - N_I}$ for $\Lambda^* = T^{N_I} + c_0 \cdot h^t \cdot T^{N_I - D_c}$. Due to Equation 11, this $\Lambda^*$ can be rewritten as $$\Lambda_* = T^{(L-1)N_I + D_c} \cdot \Delta_{T,h}^{-1} \cdot \Delta_{T,h} \cdot T^{-(L-1)N_I - D_c}$$

$$A_e = \Delta_{T,h} \cdot T^{N_I} \cdot \Delta_{T,h}^{-1} + e_{L-1} \cdot h^t \cdot T^{LN_I} \cdot \Delta_{T,h}^{-1}.$$

When the relation in Equation 12 is applied to this equation, it reduces to $A_e = [0, e_0, e_1, \ldots, e_{L-2}]$, which is a nilpotent matrix of nilpotency L×L. Therefore, since $\Lambda_e^L = 0$ and $\Lambda^* = 0$, $\Lambda_{=0}$, when $$\Lambda \cdot \Delta_{T,h}^{-1} \cdot e_{L-1}$$

is evaluated by using Equations 9 and 12 repeatedly, the relation $$\Lambda \cdot \Delta_{T,h}^{-1} \cdot e_{L-1} = T^{(L-1)N_I + D_c} \cdot \Delta_{T,h}^{-1} \cdot e_{L-1} + c_0$$

is finally obtained. Therefore, when $\Lambda = 0$, then $$c_0 = T^{(L-1)N_I + D_c} \cdot \Delta_{T,h}^{-1} \cdot e_{L-1}.$$

Note that Theorem 2 does not impose any restriction on the choice of correction time. Therefore, the correction time $D_c$ is arbitrarily selected from the range of $(0, N_I]$. A following theorem is derived from the Theorems 1 and 2.

[Theorem 3]

For an M-sequence (PRBS) of period $2^L - 1$, $\{s_k\}$, generated by the spreader SRG having the transition matrix T and the generating vector h, when an arbitrary $$A_e = \Delta_{T,h} \cdot T^{N_I} \cdot \Delta_{T,h}^{-1} + e_{L-1} \cdot h^t \cdot T^{LN_I} \cdot \Delta_{T,h}^{-1}.$$

When the relation in Equation 12 is applied to this equation, it reduces to $A_e = [0\ e_0\ e_1\ \ldots\ e_{L-2}]$, which is a nilpotent matrix of nilpotency L×L. Therefore, since $A_e^L = 0$ and $A^* = 0$, $\Lambda_{=0}$, when $$\Lambda \cdot \Delta_{T,h}^{-1} \cdot e_{L-1}$$

is evaluated by using Equations 9 and 12 repeatedly, the relation $$\Lambda \cdot \Delta_{T,h}^{-1} \cdot e_{L-1} = T^{(L-1)N_I + D_c} \cdot \Delta_{T,h}^{-1} \cdot e_{L-1} + c_0$$

is finally obtained. Therefore, when $\Lambda = 0$, then $$c_0 = T^{(L-1)N_I + D_c} \cdot \Delta_{T,h}^{-1} \cdot e_{L-1}.$$

Note that Theorem 2 does not impose any restriction on the choice of correction time. Therefore, the correction time $D_c$ is arbitrarily selected from the range of $(0, N_I]$. A following theorem is derived from the Theorems 1 and 2.

[Theorem 3]

For an M-sequence (PRBS) of period $2^L-1$, $\{s_k\}$ generated by the spreader SRG having the transition matrix T and the generating vector h, when an arbitrary sequence whose period, $N_I$, is relatively prime to the period of the M-sequence is taken as the igniter sequence and the despreader SRG is easily synchronized with the spreader SRG by using the DSA scheme of the present invention equipped with the single correction vector $c_0$ of Equation 11. This theorem is proved as follow.

$\{t_k\}$ denotes an igniter sequence of period $N_1$ and $N_1$ is relatively prime to $2^L-1$. The sequence generated by sampling the given M-sequence $\{s_k\}$ at each start of the igniter sequence period is an $N_1$-decimated sequence of the original M-sequence, and thus becomes an M-sequence of period $2^L-1$. This new sequence is denoted by $\{\bar{s}_k\}$, and then $\{\bar{s}_k\}$ has the transition matrix $\bar{T}=T_{N_i}$ and I the generating vector h.

Now, the case that $\Delta_{T,h}$ is singular is described. There exists a lowest degree non-constant polynomial $\Phi(x)$ whose degree is lower than L and $h^t \cdot \Phi(T) = 0$. Since $\{s_k\}$ is a binary M-sequence of period $2^L-1$, the characteristic polynomial $C_T(x)$ of the L×L matrix T is a primitive polynomial of degree L×L over GF(2). Dividing $C_T(x)$ by $\Phi(x)$, the relation $C_T(x)=\Phi(x)Q(x)+R(x)$ is obtained, where the degree of R(x) is lower than that of $\Phi(x)$. Substituting x=T, then multiplying $h^t$ to the left of each side of the relation, and finally applying the relation $\Phi(T)=0$, $h^tR(T)=0$ is obtained. Since the degree of R(x) is lower than that of $\Phi(x)$, R(x) should be zero by the definition of $\Phi(x)$. Therefore, $\Phi(x)$ divides $C_T(x)$. But, it is a contradiction because no non-constant polynomial whose degree is lower than L can divide a primitive polynomial of degree L. As the result, $\Delta_{T,h}$ must be singular.

Therefore, according to Theorem 1, the despreader SRG is synchronized by the igniter sequence $\{t_k\}$ of period $N_I$, and, by Theorem 2, the synchronization can be done using the single correction vector $c_0$ specified in Equation 11.

According to Theorem 3, any of the extended M-sequence may be used as the igniter sequence, since the period of each extended M-sequence is relatively prime to those of the M-sequences. The resulting DSA despreader has simple circuitry as the single correction vector $c_0$ works well on it.

A process for implementing the time-advanced sampler 112 shown in FIG. 4A is described in the following. This process is achieved by employing a new sampling vector as specified in the following theorem.

[Theorem 4] Time-Advanced Sampling Circuit $(r+I)N_I(r-t-I)N_I$ denotes the sampling time when a sample $z_i$ is taken from an SRG structured by the state transition matrix T and the generating vector h. Then, the sample $z_i$ is identical to the sample taken at time $(r+I-1)N_I$ by using the sampling vector defined by $$v_0 = (T^{N_I})^t \cdot h \qquad \text{(Equation 13)}$$

This equation is proved as following. The sequence data generated at time $(r+I-1)N_I$ may be represented by $$s_{(r+i)N_I} = h^t \cdot T^{(r+i)N_I} \cdot d_0 = ((T^{N_I})^t \cdot h) \cdot T^{(r+i-1)N_I} \cdot d_0 = ((T^{N_I})^t \cdot h)^t \cdot d_{(r+i-1)N_I}$$

This implies $$s_{(r+i)N_I} = v_0^t \cdot d_{(r+i-1)N_I}$$

for $$v_0 = (T^{N_I})^t \cdot h$$

When the sequence $\{s_k\}$ is sampled at time $(r+I-1)N_I$ by using the sampling vector $(T^m)^t h$, the sampled data is identical to the sequence data generated at time $(r+I)N_I$.

Based on the theories explained beforehand, the DSA synchronization parameters are selected according to the following procedure. Given an SRG structured by the state transition matrix T and the generating vector h, at first, the igniter sequence period is selected to be an integer relatively prime to the period $2^L-1$ of the main SRG sequence. Then, a value which is positive number and is not greater than $N_1$ is arbitrarily taken as the correction delay $D_c$.

Finally, the correction vector $c_0$ and the time-advanced sampling vector $v_0$ are determined by the Equations 11 and 13, respectively.

An example in which the main SRG sequence is an M-sequence whose characteristic polynomial is $\Psi(x) = x^{15} + x^{13} + x^8 + x^7 + x^5 + 1$, with the transition matrix T and generating vector h of the main SRG given by $$T = \left\| \begin{array}{c} 0_{141}|I_{1414} \\ 1000010111000010 \end{array} \right\| \qquad \text{(Equation 14a)}$$

$$h = [100000000000000] \qquad \text{(Equation 14b)}$$

is described in the followings. In this example, the SRG length L×L is 15. When the igniter sequence is an extended M-sequence of period 128, whose start is marked up, for example, by the symbol "1" in the 8-bit string "00000001", the sampling interval $N_I$ becomes 128 and the sampling matrix $\Delta_{T,h}$ in Equation 10 becomes nonsingular. When the correction delay time $D_c$ is set to 1, the correction vector and time-advanced sampling vectors are obtained as follows.

$$C_0 = [110111001111001], \qquad \text{(Equation 15a)}$$

$$V_0 = [101101110000010] \qquad \text{(Equation 15b)}$$

Figure 6A:
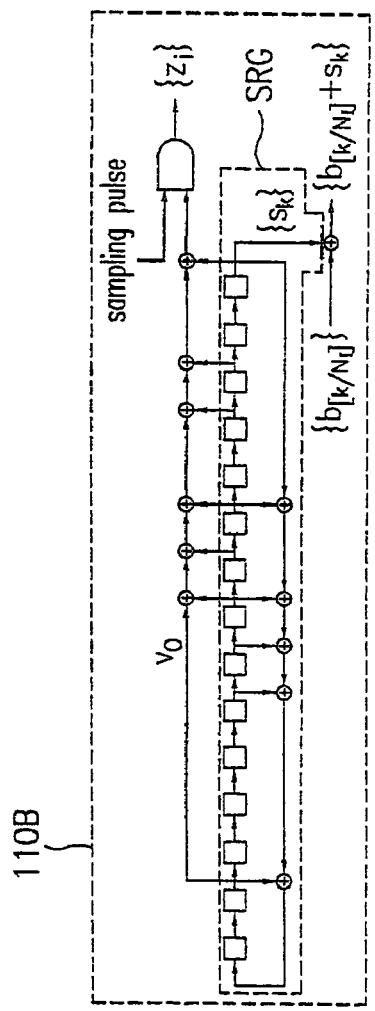
FIG. 6A is a logical structure of the spreader of DSA apparatus of FIG. 1.
Figure 6B:
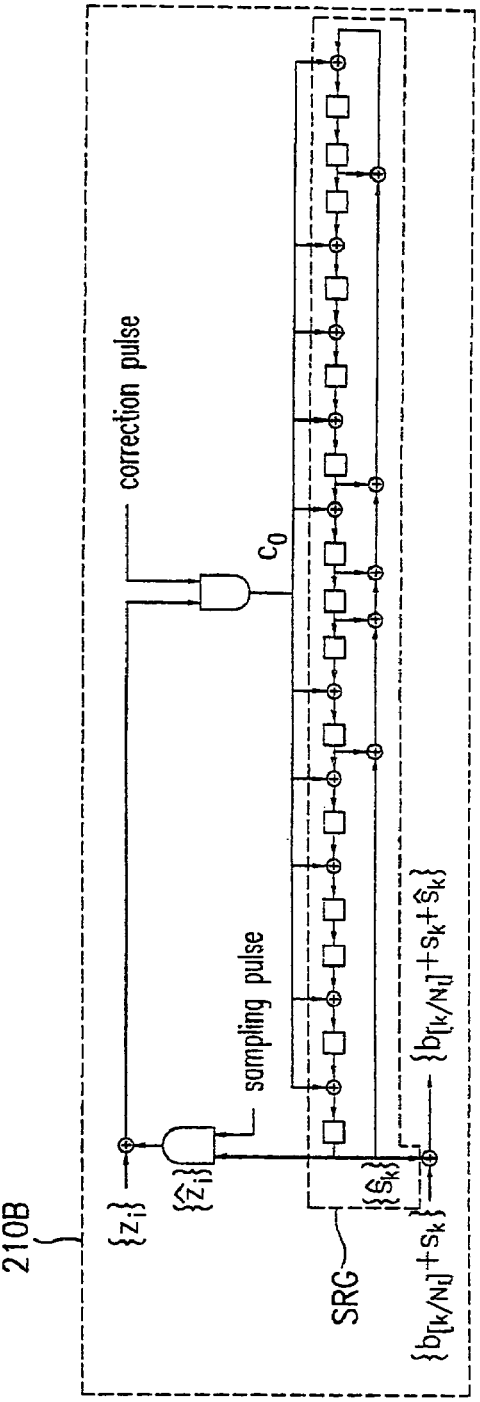
FIG. 6B is a logical structure of the despreader of DSA apparatus of FIG. 1.

FIGS. 6A and 6B show DSA spreader 11DB and DSA despreader 210B which include a time-advanced sampler and correction vectors, respectively. FIGS. 6A and 6B correspond to DSA spreader 110 and DSA despreader 210, respectively.

The evaluations of a mean acquisition time and a complexity of DSA scheme of the preferred embodiment of the present invention are described next.

Mean Acquisition Time Evaluation

The total time spent in the synchronization process, from the instant when the igniter sequence conveying the main SRG state symbol begins to the instant when the transmission of the true synchronization is confirmed is defined as an acquisition time in the present invention. It includes the time for igniter sequence acquisition, main SRG correction, and synchronization verification.

In evaluating the mean acquisition time, after tracking all the time consumption factors the moment generating function method (i.e., z-domain Narkoff chain approach) is applied. To be more specific, p(n) denotes the probability to reach the main sequence acquisition state in n time units (i.e., $n \times \tau_D$), and then its moment generating function $P_{ACQ}(z)$ is given by $$P_{ACQ}(z) = \sum_{n=0}^{\infty} p(n)z^n$$

The mean and variance of the acquisition time $T_{acq}$, are determined by employing the first and second derivatives of $P_{ACQ}(z)$ at $z=1$.

For the performance evaluation, the time $\tau_D$ for each of the following precesses: one phase comparison in the igniter sequence searching stage, one state sample detection in the main SRG correction stage, and one verification in the main sequence synchronization verification stage is assumed to be the same fixed.

In the igniter sequence searching stage, verification logics are not employed to make the evaluation simple, even though their employment would possibly reduce the overall acquisition time. In addition, the phase is assumed to advance by the step size of 1-chip, and the simple verification procedure explained beforehand is employed for the main sequence synchronization verification.

Figure 7:
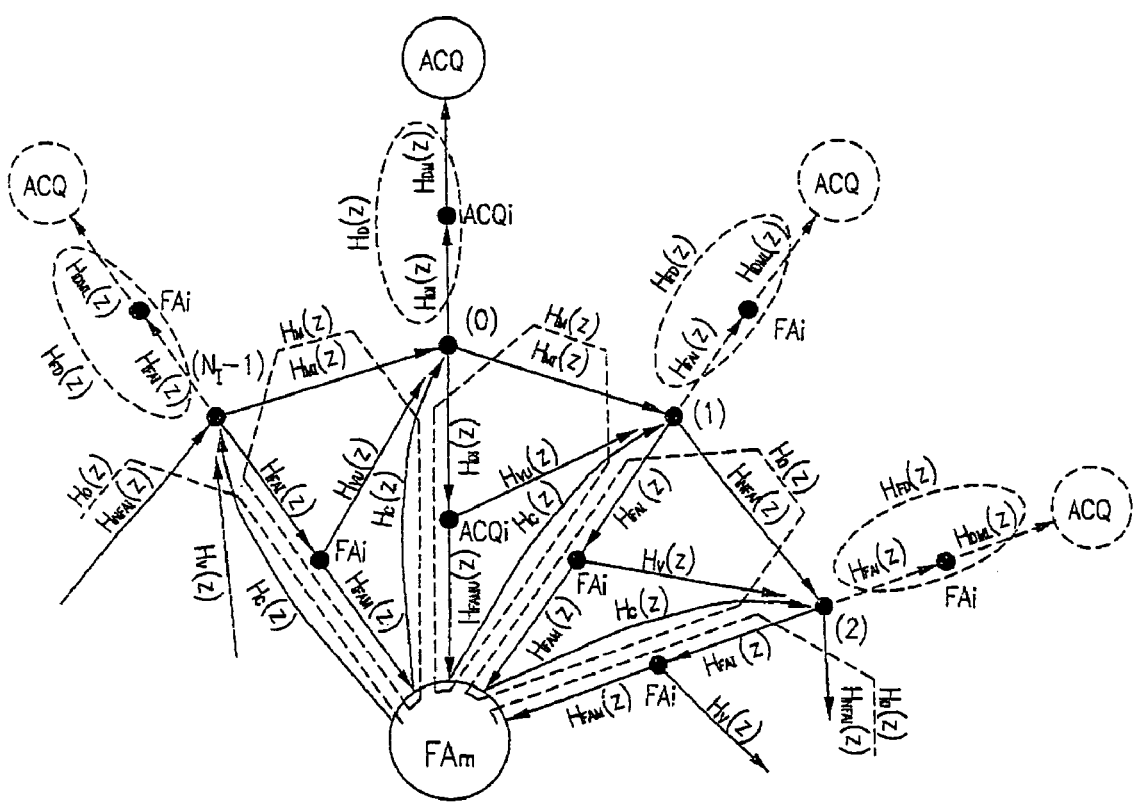
FIG. 7 is a state transition diagram corresponding to the operation of the DSA apparatus according to the present invention.

Therefore, based on the acquisition procedure described in the above explanation and in FIGS. 3A and 3B, the state transition diagram of the overall acquisition process is obtained as the circular diagram shown in FIG. 7.

In FIG. 7, the prior probabilities are not included, for which the uniform distribution is employed in the present invention, where the probability to be initially at state 1 is unity and that for all other states is zero. The states $ACQ_i$ and $FA_i$ are put twice for each segment to make the graph planar.

Referring to FIG. 7, while it is straightforward to evaluate the main acquisition time, the resulting expressions are exceedingly bulky. In order to generate meaningful and practical expressions, the moment generating functions are modified by applying the fact that L×L and V are set, in practice, large enough to make $(\frac{1}{2})^{L+V}=0$. This modification is applied to equations 8 and 9 to evaluate the mean acquisition time, as the structure of the flow graph in FIG. 7 changes to that in FIG. 3.

Consequently, the following mean acquisition times of the DSA apparatus according to the present invention are obtained as follows according to a worst distribution (W) and a uniform distribution (U), respectively.

$$E(T_{acq}^{W,DSA}) = \frac{1}{P_{d,r}P_c^{L+V}}\left[1+P_{d,r}\left\{L+3-P_c^L+\frac{P_c-P_c^V}{1-P_c}P_c^L+\frac{(K-2)(1-P_c^L)}{2^V}\right\} + (N_I-1)\left\{1+P_{ja,c}\left(L+2\frac{K-2}{2^V}\right)\right\}\right]\cdot \tau_D \quad \text{(Equation 16a)}$$

$$E(T_{acq}^{U,DSA}) = \frac{1}{P_{d,r}P_c^{L+V}}\left[1+P_{d,r}\left(L+3-P_c^L+\frac{P_c-P_c^V}{1-P_c}P_c^L+\frac{(K-2)(1-P_c^L)}{2^V}\right) + (N_I-1)\left\{1+P_{ja,c}\left(L+2\frac{K-2}{2^V}\right)\right\}\left(1-\frac{P_{d,r}P_c^{L-V}}{2}\right)\right]\cdot \tau_D \quad \text{(Equation 16b)}$$

As concerned with the igniter sequence synchronization, the probability that the detector declares a true "in-phase" state per run (i.e., one round of shift of the igniter sequence) is defined as a detection probability per run, $P_{d,r}$ and the probability that the detector declares a false "in-phase" state per phase (or "cell") is defined as a false acquisition probability per run, $P_{ja,c}$.

After the igniter sequence acquisition, regardless of the trueness of the acquisition, the conveyed state sample is detected out of the acquired igniter sequence.

When $P_e$ denotes the binary decision error probability cause by the channel noise, the correct state sample decision probability is given by $P_c=1-P_e$ in the case that the igniter sequence is synchronized, and is $\frac{1}{2}$ for the case that the igniter sequence is not synchronized.

In order to analyze the acquisition process of the DSA apparatus according to the present invention, the state transition diagram of the DSA based acquisition process is first derived. For this, a state j denotes the state of the receiver generated igniter sequence whose phase advances the received igniter sequence by j mod $N_I$ chips. Among the $N_I$ possible states, 0 through $N_I-1$, state 0 corresponds to the true "in-phase" state. States $FA_i$, $ACQ_i$, $FA_m$ and ACQ denote the igniter sequence false alarm, igniter sequence acquisition, main sequence false alarm and main sequence acquisition states, respectively.

On the other hand, the mean acquisition time of the conventional serial search acquisition (SSA) can be easily determined.

$$E\{T_{acq}^{W,SSA}\} = \frac{1}{P_{d,r}^{V+1}}\left[1+P_{d,r}\frac{1-P_{d,r}^V}{1-P_{d,r}}+(N_M-1)\right.$$
$$\left.\left(1+P_{ja,c}\left(\frac{1-P_{ja,c}^V}{1-P_{ja,c}}+KP_{ja,c}^V\right)\right)\right]\cdot \tau_D \quad \text{(Equation 17a)}$$

$$E\{T_{acq}^{U,SSA}\} = \frac{1}{P_{d,r}^{V+1}}\left[1+P_{d,r}\frac{1-P_{d,e}^V}{1-P_{d,r}}+\right.$$
$$(N_M-1)\left(1+P_{ja,c}\left(\frac{1-P}{1-P_{ja,c}}+KP_{ja,c}^V\right)\right)$$
$$\left.\left(1-\frac{P_{d,r}^{V+1}}{2}\right)\right]\cdot \tau_D \quad \text{(Equation 17b)}$$

In the verification procedure of the serial search acquisition apparatus, when a correlation larger than a threshold value V times in a row after the in-phase state is obtained the acquisition completion is declared. Otherwise, the procedure returns to the search stage. For the evaluation simplicity, dwell times for determining the in-phase condition in the verification and search stages are assumed to be identical. As the result, for the case of V=0, Equation 17a and 17b reduce to Equation 18a and 18b as follows.

$$E\{T_{acq}\} = \qquad \text{(Equation 18a)}$$
$$P_{d,r}^{-1}\left(1 + (1 + KP_{FA,C})\left(\frac{v-1}{2}\right)(2 - P_{d,r})\right)\tau_D$$

(uniform distribution)

$$E\{T_{acq}\} = P_{d,r}^{-1}(1+(v-1)(1+KP_{FA,C}))\tau_D \qquad \text{(Equation 18b)}$$

(worse-case distribution)

Based on Equations 16a, 16b, 17a, and 17b, the acquisition performances of the DSA apparatus according to the present invention are compared with those of the conventional SSA.

Under the assumption that the detection probability $P_{d,r}$ is 0.99, the false alarm probability $P_{fa,c}$ is 0.01. When the false alarm penalty factor K is 1000, the false alarm penalty time is $1000_D$ The state symbol error probability $P_e(=1-P_c)$ of 0.01.

In the example of the preferred embodiment of the present invention, the probabilities are assumed to be constant for the evaluation simplicity, but the probabilities $P_{d,r}$, $P_{fa,c}$ and $P_{d,r}$ are related to each other and determined according to the chip SNR, $N_f$, a threshold value, and so forth.

Figure 8A:
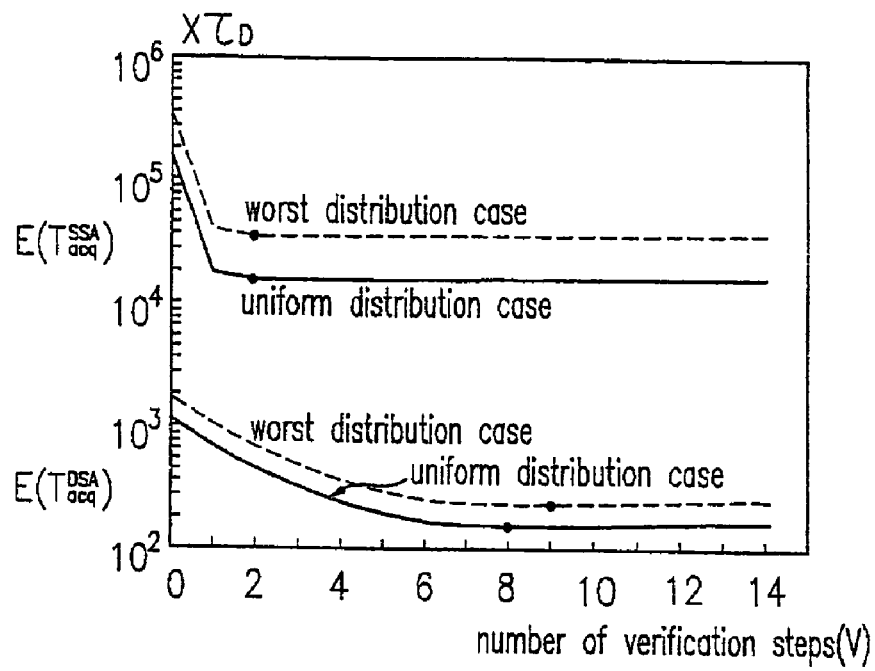
FIGS. 8A and 8B are graphs showing the comparison of mean acquisition times and the mean acquisition time ratio between DSA and conventional serial search acquisition (SSA), respectively.
Figure 8B:
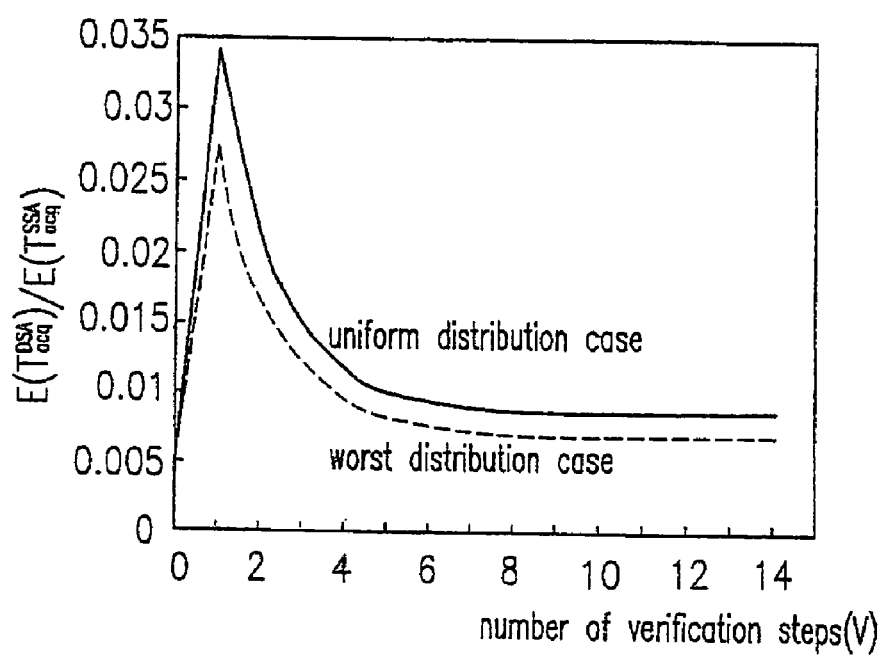

FIG. 8 shows the comparison result for the two schemes in terms of mean acquisition times and their ratio, for varying verification step size V of 0 through L×L−1.

Referring to FIG. 8, the dots on the curves indicates the optimal verification step sizes that minimize the mean acquisition time, and the dramatic improvements in acquisition time for the DSA apparatus according to the present invention are observed. That is, the mean acquisition time of the DSA apparatus becomes more than 100 times shorter than that of the conventional SSA scheme.

Figure 9A:
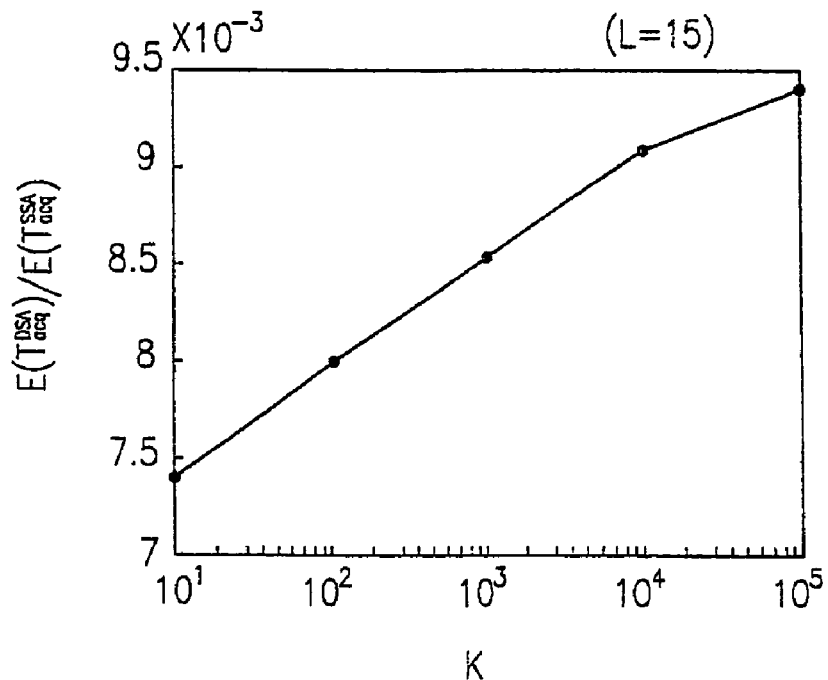
FIGS. 9A and 9B are graphs showing mean acquisition time ratio vs. False alarm penalty time K and vs. Main SRG length L, respectively.
Figure 9B:
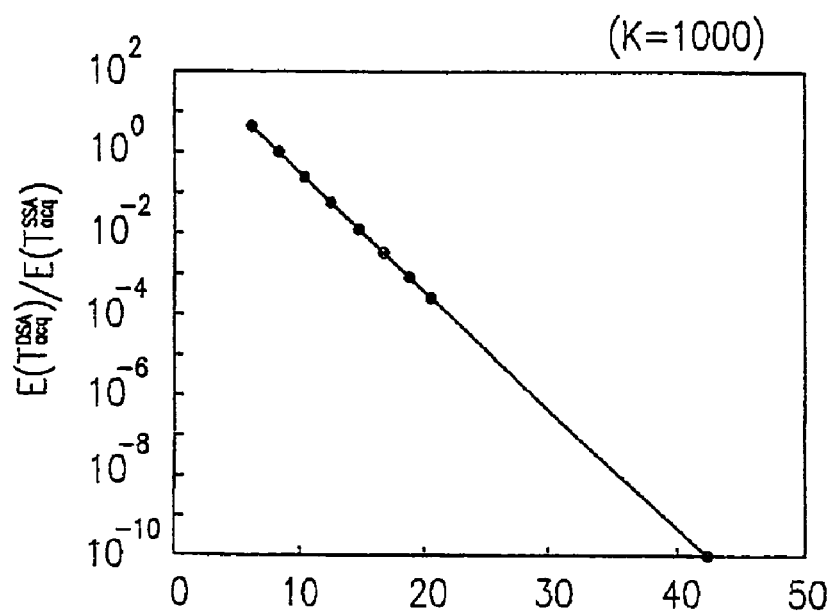

FIGS. 9A and 9B show the graphs of the acquisition time ratio of the DSA apparatus over the conventional SSA scheme in terms of false alarm penalty factor K (for L×L=15) and main sequence SRG length L×L (for K=1000), respectively.

FIG. 9A shows that the ratio increases as the penalty time increases, but within the same order of magnitude. FIG. 9B shows that the acquisition time ratio decreases exponentially as the SRG length increases. Thus, the advantage of the DSA apparatus according to the present invention becomes substantial for long PN sequences.

Implementation Complexity of DSA Apparatus

The implementation complexity of the DSA apparatus according to the preferred embodiment of the present invention is explained as follows.

Referring to FIGS. 1A and 1B, the implementation of the DSA apparatus is preferably done by installing an igniter sequence generation block including a short length SRG, a time-advanced sampling circuit in the transmitter block, and a correction circuit and a verification circuit in the receiver block in addition to the conventional serial search acquisition device.

However, in spite of all of the functional increases, the required hardware increase is very little, as shown in FIG. 6. To be more specific, the sampling and correction circuits are implemented by a few gates and wirings. A simple counter is enough for the verification logic, and the existing data symbol generation and detection blocks may be arranged to carry out the state symbol generation and detection function, without adding additional hardware. On the contrary, a parallel search scheme, which is the only scheme comparable to the DSA scheme of the present invention in terms of acquisition time, requires as much hardware penalty as the acquisition time gain, because the reduction in acquisition time is directly proportional to the number of duplications of parallel branches. Consequently, the required hardware complexity is much higher for the parallel search scheme than that of the DSA scheme according to the present invention. In order to achieve the acquisition time ratio of 0.01, the parallel search scheme requires more that 100 parallel branch circuits each of which contains an SRG having its own initial state values and detection circuits.

According to the preferred embodiment of the present invention, at least two major problems related to SRG state-based acquisition reliable conveyance of the state samples in the practical low SNR CDMA channels and effective manipulation of the conveyed state samples for synchronization acquisition, are solved by the proposed DSA techniques.

In the DSA scheme according to the preferred embodiment of the present invention, the short-period igniter sequence which is intended to convey the state samples of the main SRG, is synchronized through conventional serial search, but the long-period main sequence is itself synchronized by the conveyed state samples.

The design method of the DSA scheme according to the present invention is provided through theorems, which include sampling time, time-advanced sampling circuit, correction time, and correction circuit.

The mean acquisition time of the DSA scheme according to the present invention reduces dramatically at the cost of small hardware increase. For example, in the case of the PN sequence of period $2^{15}-1$, the mean acquisition time of the DSA scheme according to the present invention reduces to a hundredth of that of the conventional serial search acquisition schemes.

Furthermore, the DSA scheme according to the present invention does not require the coherent acquisition that used to be required by some existing sequential estimation techniques.

It will be apparent to those skilled in the art that various modifications and variations can be made in the distributed sample acquisition scheme of the present invention to obtain a fast acquisition of PN sequence without departing from the spirit or scope of the invention. Thus, it is intended that the present invention covers the modifications and variations of this invention provided they come within the scope of the appended claims and their equivalents.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for processing signals in a communication system, comprising
   time-advance sampling a state sample of the main sequence which includes a PN sequence;
   generating a state signal based on the time-advanced state sample and a first igniter sequence;

spreading a data steam based on the first main sequence; and transmitting the state signal and a data signal which corresponds to the spread data stream.

2. The method of claim 1, further comprising receiving and despreading the state signal based on a second igniter sequence; and receiving and despreading the data signal based on the despread state signal and a second main sequence which includes a PN sequence.

3. The method of claim 2, wherein the first and second main sequences are generated by shift register generators (SRGs) which have different structures.

4. The method of claim 1, wherein the first igniter sequence and the first main sequence are transmitted simultaneously.

5. The method of claim 1, wherein the first igniter sequence has a period having a start time which corresponds to a position of a single bit of a multi-bit string value.

6. The method of claim 1, further comprising:

receiving and synchronizing the first igniter sequence by:

acquiring the first igniter sequence transmitted from a transmitter of the communication system; and determining an acquisition completion of the first igniter sequence.

7. A method for processing signals in a receiver, comprising:

receiving and despreading a state signal based on an igniter sequence; and receiving and despreading a data signal based on the despread state signal and a main sequence which includes a PN sequence.

8. The method of claim 7, further comprising:

detecting a state sample based on the despread state signal by tracking the main sequence;

reconfirming a synchronization state obtained during the detecting step; and continuing the detecting step in succession when an accurate acquisition is confirmed by observing detection characteristics for a prescribed period of time.

* * * * *